US012718046B2

(12) United States Patent
Nakao et al.

(10) Patent No.: US 12,718,046 B2
(45) Date of Patent: Aug. 25, 2026

(54) INFORMATION CODE AND CODE GENERATION METHOD

(71) Applicant: DENSO CORPORATION, Kariya-city (JP)

(72) Inventors: Koichi Nakao, Kariya-city (JP); Mitsuo Okumura, Kariya-city (JP); Tatsuya Okabe, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 19/083,036

(22) Filed: Mar. 18, 2025

(65) Prior Publication Data

US 2025/0245466 A1 Jul. 31, 2025

Related U.S. Application Data

(63) Continuation of application No. PCT/JP2023/030948, filed on Aug. 28, 2023.

(30) Foreign Application Priority Data

Sep. 21, 2022 (JP) ................................ 2022-150581

(51) Int. Cl.
*G06K 19/06* (2006.01)

(52) U.S. Cl.
CPC .............................. *G06K 19/06046* (2013.01)

(58) Field of Classification Search
None
See application file for complete search history.

(56) References Cited

U.S. PATENT DOCUMENTS

2022/0122026 A1 4/2022 Okabe et al.
2023/0094590 A1 3/2023 Okabe

FOREIGN PATENT DOCUMENTS

JP 2010271812 A * 12/2010
JP 2021196762 A * 12/2021 ......... G06K 19/0614

* cited by examiner

*Primary Examiner* — Kristy A Haupt
(74) *Attorney, Agent, or Firm* — Precision Patents, P.C.

(57) ABSTRACT

An information code includes an information recording area and a state reference area. The information code is generated by combining two pre-combination codes, each of which records information by an array of light cells and dark cells. The information recording area includes multiple types of composite cells, which have different states from the light cells and the dark cells. Information of each of the two pre-combination codes is recorded in the information recording area by the multiple types of the composite cells. The state reference area is arranged in at least one defined pattern, which has a shape defined in advance and is used for reading the information recording area and indicating respective states of the composite cells. In the at least one defined pattern, cells indicating the states of the multiple types of the composite cells included in the information recording area are arranged in consecutive manner.

7 Claims, 7 Drawing Sheets

Cd1
Cew
Ceb
Ce
PUBLIC CODE
Cd2
Cew
Ceb
Ce
CONFIDENTIAL CODE
IV
Ce, CeL
Cc1
Cc2
FiP
CQ2
FiP, 70
82f
81f
83f
84f
60
AIP, 70
FiP
82f
81f
83f
Ceb
Cew
Ce
V
AIP
QZ
■…Ceb: BLACK
▩…Cc2: RED OR NAVY BLUE
□…Cew: WHITE
▤…Cc1: YELLOW OR LIGHT BLUE
INFORMATION CODE

INFORMATION CODE AND CODE GENERATION METHOD

CROSS REFERENCE TO RELATED APPLICATIONS

The present application is a continuation application of International Patent Application No. PCT/JP2023/030948 filed on Aug. 28, 2023, which designated the U.S. and claims the benefit of priority from Japanese Patent Application No. 2022-150581 filed on Sep. 21, 2022. The entire disclosures of all of the above applications are incorporated herein by reference.

TECHNICAL FIELD

The present disclosure relates to a technique of information code for recording information.

BACKGROUND

There has been known an information code generated by combining two QR codes (registered trademark). Such an information code includes, in addition to a black cell and a white cell, a light gray cell and a dark gray cell. Information recorded in multiple QR codes is readable individually by reading a two-dimensional array of these cells.

SUMMARY

The present disclosure provides an information code, which includes an information recording area and a state reference area. The information code is generated by combining two pre-combination codes, each of which records information by an array of light cells and dark cells. The information recording area includes multiple types of composite cells, which have different states from the light cells and the dark cells. Information of each of the two pre-combination codes is recorded in the information recording area by the multiple types of the composite cells. The state reference area is arranged in at least one defined pattern, which has a shape defined in advance and is used for reading the information recording area and indicating respective states of the composite cells. In the at least one defined pattern, cells indicating the states of the multiple types of the composite cells included in the information recording area are arranged in consecutive manner.

BRIEF DESCRIPTION OF DRAWINGS

Objects, features and advantages of the present disclosure will become apparent from the following detailed description made with reference to the accompanying drawings. In the drawings.

DETAILED DESCRIPTION

In the above-described information code generated by combining two QR codes, when gray cells are used to record information, information indicating what color cells exist other than white and black cells is necessary. In this case, for cells having different states from those of white cells and black cells, a process must be performed to specify state information, such as colors or patterns of the cells before reading the code. This process may reduce a use convenience of the information code.

According to an aspect of the present disclosure, an information code includes an information recording area and a state reference area. The information code is generated by combining two pre-combination codes, each of which records information by an array of light cells and dark cells. The information recording area includes multiple types of composite cells, which have different states from the light cells and the dark cells. Information of each of the two pre-combination codes is recorded in the information recording area by the multiple types of the composite cells. The state reference area is arranged in at least one defined pattern, which has a shape defined in advance and is used for reading the information recording area and indicating respective states of the composite cells. In the at least one defined pattern, cells indicating the states of the multiple types of the composite cells included in the information recording area are arranged in consecutive manner.

According to another aspect of the present disclosure, a code generation method, which is executed by at least one processing unit, includes: preparing two pre-combination codes each of which recording information using an array of light cells and dark cells; generating an information recording area that records the information of each of the two pre-combination codes using multiple types of composite cells, the composite cells having different states from the light cells and the dark cells; and generating a state reference area indicating respective states of the composite cells in at least one defined pattern, which has a shape defined in advance and is used for reading the information recording area. The state reference area is generated such that cells indicating the states of the multiple types of the composite cells included in the information recording area are arranged in consecutive manner.

In the above-described aspects, when reading the information code, states of the composite cells can be determined by referring to the state reference area located at a predefined position. Therefore, even if the composite cells having a different configuration from the light and dark cells is used in the information recording area, there is no need to specify the states of composite cells in advance, thereby ensuring the convenience of information code.

Figure 1:
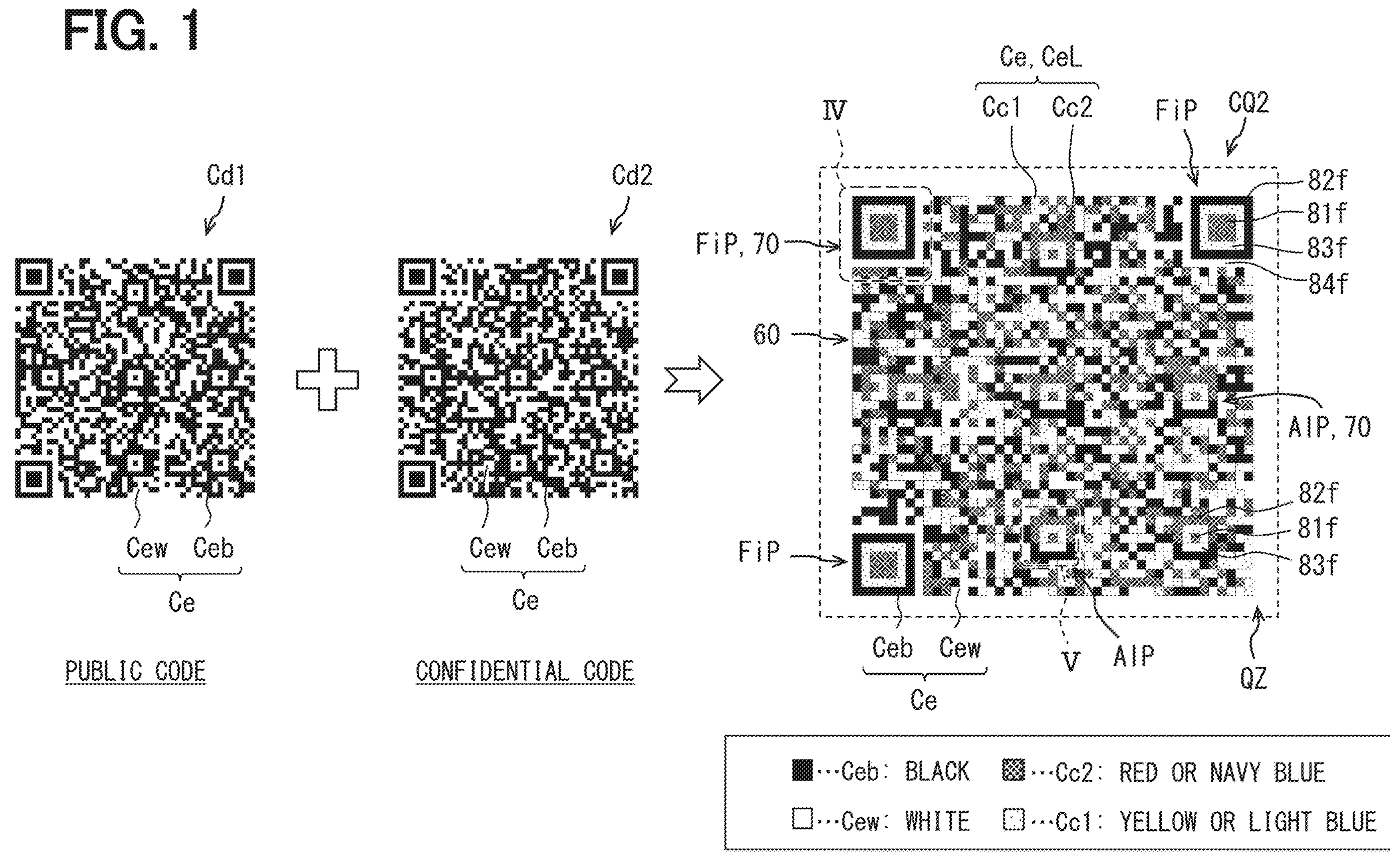
FIG. 1 is a diagram showing an information code according to an embodiment of the present disclosure.

The following will describe an embodiment of the present disclosure with reference to the accompanying drawings. An information code CQ2 according to an embodiment of the present disclosure shown in FIG. 1 is generated by combining two two-dimensional codes. The two-dimensional codes correspond to the source of the information code CQ2. For example, the two-dimensional code may be a QR code, and information is recorded by two-dimensional arrangement of multiple cells Ce. The information code CQ2 is printed on a paper medium or the like, and is used in the form of a code-printed medium such as a label, a sticker, or a tag. The information code CQ2 may be displayed on a display device, such as a display or electronic paper.

The information code CQ2 in the present embodiment is generated by combining a public code Cd1 and a confidential code Cd2. When the information code CQ2 is read by a normal reader, such as a code reader 13 (see FIG. 2) to be described later, the information code CQ2 is recognized as the public code Cd1. In this case, information recorded in the public code Cd1 (hereinafter referred to as public information) is read. The confidential code Cd2 is readable by a special reader, such as a code scanner 23 (see FIG. 2) to be described later. In this case, information recorded in the confidential code Cd2 (hereinafter referred to as confidential information) is read.

Figure 2:
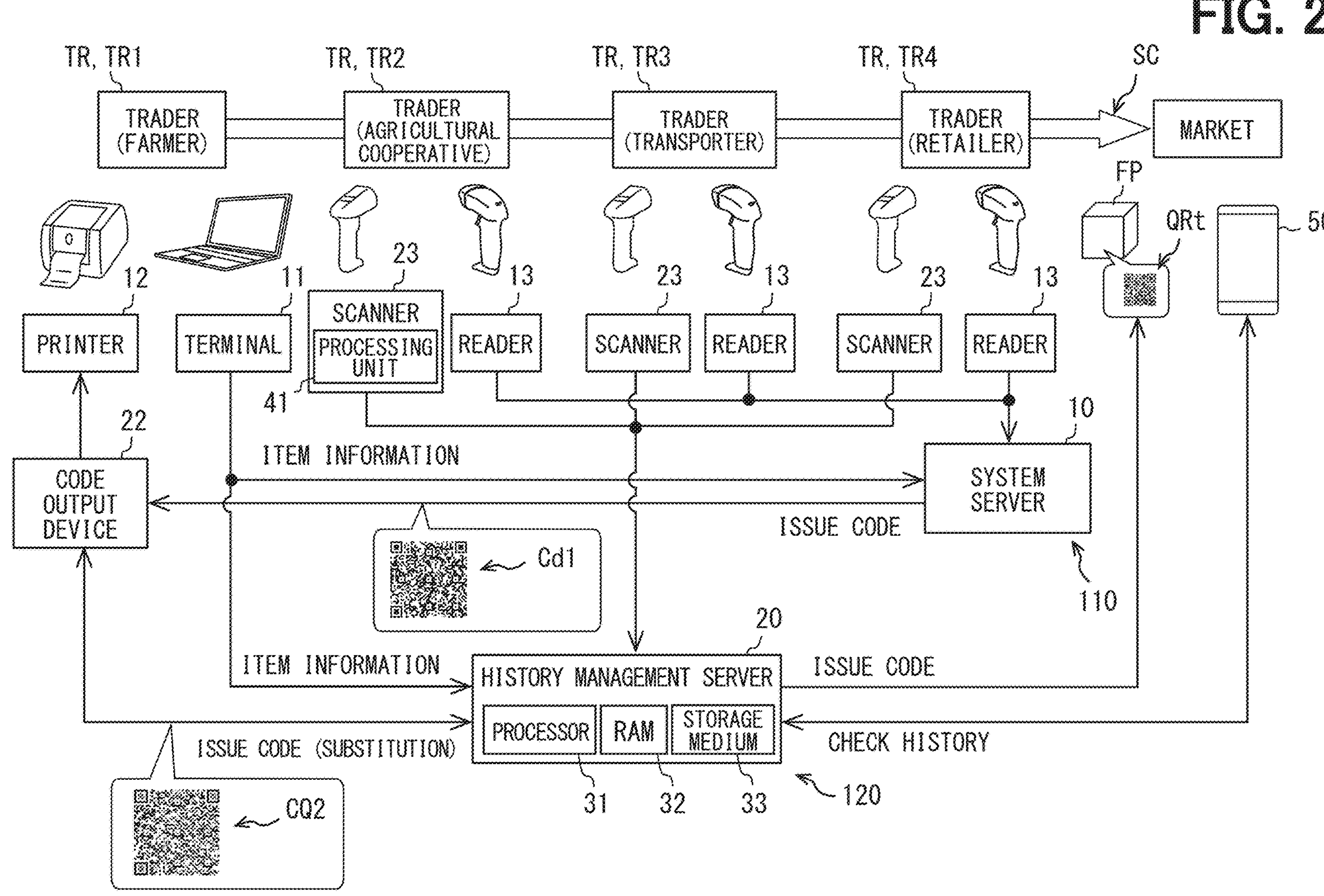
FIG. 2 is a diagram showing an overall image when a traceability system is operated together with an existing distribution management system.

The information code CQ2 is used in both of a distribution management system 110 and a traceability system 120, which are shown in FIG. 2. The distribution management system 110 and the traceability system 120 are management systems that manage a supply chain SC structured to include a large number of transaction parties TR. The supply chain SC is configured to deliver industrial products, agricultural products, aquatic products and the like from one transaction party to another transaction party, and finally to an end user. As an example, in the supply chain SC for delivering an agricultural product to a consumer, the transaction parties TR includes a farmer TR1, an agricultural cooperative TR2 that is a collection facility, a transporter TR3, and a retailer TR4.

The distribution management system 110 collects, using the public code Cd1, a transaction record of a transaction item between the transaction parties TR. The public code Cd1 is a QR code used by the distribution management system 110. The distribution management system 110 includes an input terminal 11, a label printer 12, a code reader 13, and a system server 10. The input terminal 11, the label printer 12, and the code reader 13 are appropriately provided at a facility of each transaction party TR. The input terminal 11, the label printer 12, and the code reader 13 are connected, via a network, to the system server 10 provided at a data center or the like.

For example, the input terminal 11 is a personal computer or a tablet terminal. Basic information on the transaction item (hereinafter referred to as item information) provided to the supply chain SC is input to the input terminal 11 according to a predetermined format. For example, the item information includes an article name, a production place, a production facility, and a producer. The input terminal 11 transmits, to the system server 10, the item information on the transaction item shipped from the transaction party TR.

The label printer 12 is an output device for printing the public code Cd1 on a paper medium. The label printer 12 is configured to perform color or grayscale printing. The paper medium where the public code Cd1 is printed is attached to a package, an outer box, or the like of the transaction item to be shipped, and the transaction item is delivered with the paper medium being attached to the transaction item.

The code reader 13 is a reading device that acquires the public information recorded in the public code Cd1 by reading the public code Cd1. The code reader 13 acquires the public information recorded in the public code Cd1, and transmits the acquired public information to the system server 10.

The system server 10 is a host node capable of communicating with the input terminal 11, the label printer 12, and the code reader 13. The system server 10 registers the item information acquired from the input terminal 11 in a database. The system server 10 prepares the public information associated with the item information, and generates the public code Cd1 in which the public information is recorded. As a process of generating the public code Cd1, the system server 10 transmits image data of the generated public code Cd1 to the label printer 12, which is a transmission source of the item information. When the generated public code Cd1 is distributed together with the transaction item and is read by the code reader 13 of another transaction party TR, the system server 10 accumulates the transaction record of the transaction item read by each transaction party TR.

The traceability system 120 is used in combination with the distribution management system 110, and accumulates the transaction record in the same manner as the distribution management system 110. Specifically, the distribution management system 110 corresponds to an old management system, and the traceability system 120 corresponds to a new management system. The traceability system 120 is operated together with the existing distribution management system 110 without substantially changing the distribution management system 110. In addition to a record generation function of accumulating the transaction record, the traceability system 120 has a record reference function of providing the accumulated transaction record in a manner that allows reference thereto. In the traceability system 120, blockchain technology is used to manage the transaction record for the purpose of preventing tampering with the transaction record.

The traceability system 120 collects the transaction record using the information code CQ2, which is generated based on the public code Cd1. As described above, the public code Cd1 is generated by the system server 10. The traceability system 120 includes a code output device 22, a code scanner 23, and a history management server 20. In the traceability system 120, the input terminal 11 and the label printer 12 of the distribution management system 110 are used. The code output device 22, the code scanner 23, and the input terminal 11 are connected, via a network, to the history management server 20 provided at a data center or the like.

The code output device 22 is provided at the facility of the transaction party TR where the label printer 12 is provided. The code output device 22 is provided in a manner that intercepts a communication line between the system server 10 and the label printer 12, and acquires data of the public code Cd1 transmitted from the system server 10 to the label printer 12. The code output device 22 transmits the acquired data of the public code Cd1 to the history management server 20.

The code output device 22 receives, from the history management server 20, data of the information code CQ2 generated based on the transmitted public code Cd1. The confidential information used in the traceability system 120 is recorded in the information code CQ2. The code output device 22 transmits data of the information code CQ2 to the label printer 12 instead of the data of the public code Cd1. Due to such intervention of the code output device 22, the label printer 12 prints the information code CQ2 on a paper medium without recognizing any modification (substitution) of the acquired code data. As a result, instead of the public code Cd1, the code-printed medium where the information code CQ2 is printed is attached to the transaction item and distributed together with the transaction item.

The code scanner 23 is a reading device that reads the confidential information recorded in the information code CQ2. The confidential information is added to the information code CQ2 separately from the public information. Since the code scanner 23 is configured to scan the same target object as the code reader 13, the code scanner 23 may be physically integrated with the code reader 13. The code scanner 23 includes an image sensor in which CCD elements are arranged in a two-dimensional array, a signal processing unit 41, and the like. The image sensor is capable of reading information recorded on a plane at a higher resolution than the code reader 13. The image sensor outputs a captured image indicating the information code CQ2 (hereinafter, referred to as a code captured image IMc, see FIG. 3) to the signal processing unit 41.

The signal processing unit 41 includes a storage medium that stores a code reading program and the like, a processor that executes a code reading process (see FIG. 7) according to the code reading program, and a RAM. The signal processing unit 41 decodes a read signal (code captured image) of the image sensor according to a predetermined rule by executing a code reading process, and acquires the confidential information recorded in the information code CQ2. Based on the acquired confidential information, the signal processing unit 41 communicates with the history management server 20 in order to store the transaction record.

A smartphone, a tablet terminal, and the like having a camera function may be used as the code scanner 23. In this aspect, a dedicated application (hereinafter referred to as a code reading application) corresponding to the code reading program is provided and installed in a smartphone or the like. The code reading application is capable of reading the public code Cd1, in addition to reading of the confidential code Cd2 (see FIG. 1).

The history management server 20 is a host node capable of communicating with the input terminal 11 in addition to the code output device 22 and the code scanner 23. The history management server 20 is mainly implemented by a computer including a processor 31, a RAM 32, a storage medium 33, an input and output interface, and a bus that connects these components. The processor 31 is a hardware circuit coupled with the RAM 32 for computation processing. The processor 31 executes various types of processing related to data management by accessing the RAM 32. The storage medium 33 stores, as a management program related to data management, a code generation program for causing the processor 31 to execute a code generation method according to the present disclosure.

The history management server 20 acquires the item information transmitted from the input terminal 11 to the system server 10. Based on acquisition of the item information, the history management server 20 generates a blockchain, which is associated with the transaction item and stores the item information and the transaction record. When the history management server 20 receives a notification from the code scanner 23 of each trader TR that the information code CQ2 (confidential code Cd2) has been read, the history management server 20 accumulates the transaction record from the trader TR, which has transmitted the notification, in the blockchain associated with the transaction item.

Upon acquiring the notification from the code scanner 23, the history management server 20 generates a new block for storing the transaction record of the transaction party TR from which the notification is transmitted. The new block includes a hash value calculated from an immediately preceding block in addition to the current transaction record. A hash function such as SHA-256 is used to generate the hash value of the immediately preceding block. The hash value is data in which a predetermined number of bits (for example, 256 bits) are maintained and in which the item information and the transaction record are reflected.

The history management server 20 executes a code generation process (see FIG. 6) to be described later based on data acquisition of the public code Cd1 from the code output device 22, and generates the information code CQ2 in which at least the hash value is recorded as the confidential information. The history management server 20 transmits the generated information code CQ2 to the code output device 22. As a result, a hash value reflecting the item information and transaction record is recorded in the information code CQ2 (confidential code Cd2), making it possible to distribute the information together with the transaction item.

In the traceability system 120, one information code CQ2 may be continuously used for multiple transaction parties TR, or a new information code CQ2 may be generated for each transaction party TR. In the configuration in which the new information code CQ2 is generated for each transaction party TR, a latest hash value reflecting the transaction record may be generated in response to occurrence of the transaction record in each transaction party TR. The history management server 20 newly generates the information code CQ2 in which the latest hash value is recorded as the confidential information, and provides data of the new information code CQ2 to the label printer 12, which is provided at the facility of the transaction party TR who performs the transaction. As a result, as the transaction of item progresses, a content (hash value) recorded in the information code CQ2 continues to be updated to a content reflecting the transaction record so far. Since the confidential information mainly includes the hash value, an amount of data in the confidential information can be maintained at a constant level even when the transaction of item progresses in the supply chain SC.

The history management server 20 is also capable of generating a trace code QRt. The trace code QRt is a two-dimensional code, such as a QR code attached to a final product FP provided by the supply chain SC. The trace code QRt enables a consumer who obtains the final product FP to check the transaction record. The trace code QRt records, as an example, a hash value calculated from a last block of the blockchain and an IP address or URL indicating an inquiry destination of the transaction record.

The consumer of the final product FP can view the transaction record of the final product FP on a user terminal 50 such as a smartphone or a tablet terminal, using a traceability check application. Upon reading the trace code QRt attached to the final product FP, the user terminal 50 transmits a reference request for the transaction record together with the hash value to the history management server 20, which corresponds to the inquiry destination. Upon receiving the reference request, the history management server 20 extracts the item information and the transaction record associated with the hash value, and generates reference data to be provided to the user terminal. The history management server 20 transmits the generated reference data to the user terminal 50 that issues the reference request. The consumer of the final product FP can check a history of the transaction record by loading the reference data transmitted from the history management server 20 using the traceability check application.

The following will describe details of the information code CQ2 with reference to FIG. 1 and FIG. 3 to FIG. 5.

As described above, the information code CQ2 is generated by combining the public code Cd1 and the confidential code Cd2 (see FIG. 1). The public code Cd1 and the confidential code Cd2 each records information using a two-dimensional array of white cells Cew and black cells Ceb. The public code Cd1 and the confidential code Cd2 are two-dimensional codes having the same number of cells (version). Therefore, each cell Ce of the public code Cd1 and each cell Ce of the confidential code Cd2 are combined in a ratio of 1:1. As a result, the information code CQ2 obtained by combining the public code Cd1 and the confidential code Cd2 becomes a two-dimensional code having the same number of cells (version) as the public code Cd1 and the confidential code Cd2.

The information code CQ2 includes white cells Cew, black cells Ceb, light color cells Cc1, and dark color cells Cc2. The light color cell Cc1 and the dark color cell Cc2 are composite cells CeL that are different in appearance from the white cell Cew and the black cell Ceb. The white cell Cew and the black cell Ceb correspond to reference cells. Each cell Ce in the information code CQ2 is determined based on a combination of the white cell Cew and the black cell Ceb in the public code Cd1 and the confidential code Cd2 (see FIG. 6).

In the information code CQ2, a cell Ce, which is located at a position where corresponding cell in the public code Cd1 is a white cell Cew and corresponding cell in the confidential code Cd2 is a white cell Cew, is defined as a white cell Cew. In the information code CQ2, a cell Ce, which is located at a position where corresponding cell in the public code Cd1 is a black cell Ceb and corresponding cell in the confidential code Cd2 is a black cell Ceb, is defined as black cell Ceb. In the information code CQ2, a cell Ce, which is located at a position where corresponding cell in the public code Cd1 is a white cell Cew and corresponding cell in the confidential code Cd2 is a black cell Ceb, is defined as a light color cell Cc1. In the information code CQ2, a cell Ce, which is located at a position where corresponding cell in the public code Cd1 is a black cell Ceb and corresponding cell in the confidential code Cd2 is a white cell Cew, is defined as a dark color cell Cc2.

The light color cell Cc1 is a cell Ce having a chromatic color whose lightness is closer to the white cell Cew than to the black cell Ceb and whose lightness is higher than that of the dark color cell Cc2. For example, yellow may be adopted as the color of light color cell Cc1. The dark color cell Cc2 is a cell Ce having a chromatic color whose lightness is closer to the black cell Ceb than to the white cell Cew and whose lightness is lower than that of the light color cell Cc1. For example, red may be adopted as the color of dark color cell Cc2. The chromatic colors that can be used as colors of the light color cell Cc1 and the dark color cell Cc2 can be changed as appropriate. For example, the light color cell Cc1 and the dark color cell Cc2 may be a combination of light blue and navy blue.

The information code CQ2 includes an information recording area 60, a quiet zone QZ, and a finder pattern FiP. The information recording area 60 is the main area of the information code CQ2. The information code CQ2 has white cells Cew, black cells Ceb, and multiple (two) types of composite cells CeL, that is, light color cells Cc1 and dark color cells Cc2. The information recording area 60 records both of the public information recorded in the public code Cd2 and the confidential information recorded in the confidential code Cd2. The public information and the confidential information are recorded in the information recording area using a two-dimensional array of white cells Cew, black cells Ceb, light color cells Cc1, and dark color cells Cc2.

The quiet zone QZ is provided in an area adjacent to or in contact with the information recording area 60, and is a blank area surrounding the outer periphery of the information recording area 60 and the finder pattern FiP. The quiet zone QZ has the same appearance (color) as the white cell Cew. As an example, a blank area equivalent to at least four cells Ce may be secured as the quiet zone QZ.

The finder pattern FiP is provided in an area adjacent to or in contact with the information recording area 60, and is a pattern for detecting the position of two-dimensional code (information code CQ2). The finder patterns FiP are formed at three of the four corners of the two-dimensional code. The finder pattern FiP includes a square-shaped central portion 81*f*, a square-shaped frame portion 82*f* surrounding the central portion 81*f*, an inner blank portion 83*f* separating the central portion 81*f* from the frame portion 82*f*, and an L-shaped outer blank portion 84*f* separating the frame portion 82*f* from the information recording area 60.

In an inner region of the information recording area, which is located within the information recording area 60, an alignment pattern AlP, a timing pattern, and a format information area are arranged. In the inner region of the information recording area, multiple alignment patterns AlP are arranged at intervals at multiple locations. The alignment pattern AlP is used to correct a positional deviation of each cell Ce caused by distortion. The alignment pattern AlP includes a square-shaped central portion 81*a*, a square-shaped frame portion 82*a* surrounding the central portion 81*a*, and an inner blank portion 83*a* separating the central portion 81*a* from the frame portion 82*a*.

The timing pattern connects two of the three finder patterns FiP in a straight line, and has an L-shape. In the timing pattern, the white cells Cew and the black cells Ceb are arranged in alternative manner. The timing pattern is used to determine the coordinates. The format information area is an area for recording two-dimensional code format information, specifically, information indicating an error correction level, a mask pattern, and the like. The format information area has an I-shape or L-shape, and is located at an outer edge of the information recording area 60 to face the finder pattern FiP.

In the distribution management system 110, which corresponds to the old management system, the code reader 13 (see FIG. 2) detects the lightness of each cell Ce, that is, light reflectance of each cell Ce when the information code CQ2 is read by the code reader 13. Therefore, the code reader 13 determines the light color cell Cc1 as a white cell Cew, and determines the dark color cell Cc2 as a black cell Ceb. As a result, the code reader 13 recognizes that the information code CQ2 is substantially the same two-dimensional code as the public code Cd1, and reads the public information from the information code CQ2.

In the traceability system 120, which corresponds to the new management system, the code scanner 23 (see FIG. 2) can recognize the light color cell Cc1 and the dark color cell Cc2, which are the composite cells CeL, from the white cell Cew and the black cell Ceb. When reading the information code, information indicating what colors of composite cells CeL exist other than the white cells Cew and the black cells Ceb is necessary. That is, information indicating colors that serve as the reference for identification (hereinafter referred to as reference colors, see FIG. 3) for the four colors used in the information code CQ2*x* is necessary.

Figure 3:
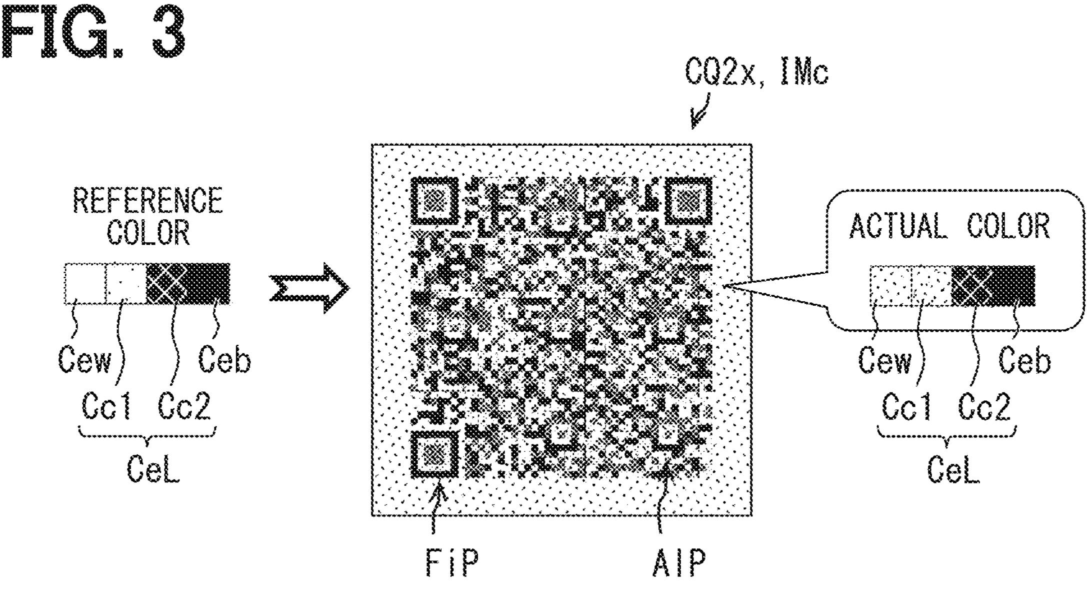
FIG. 3 is a diagram showing an example of an information code according to a comparative example in which a color reference area is not provided.
Figure 4:
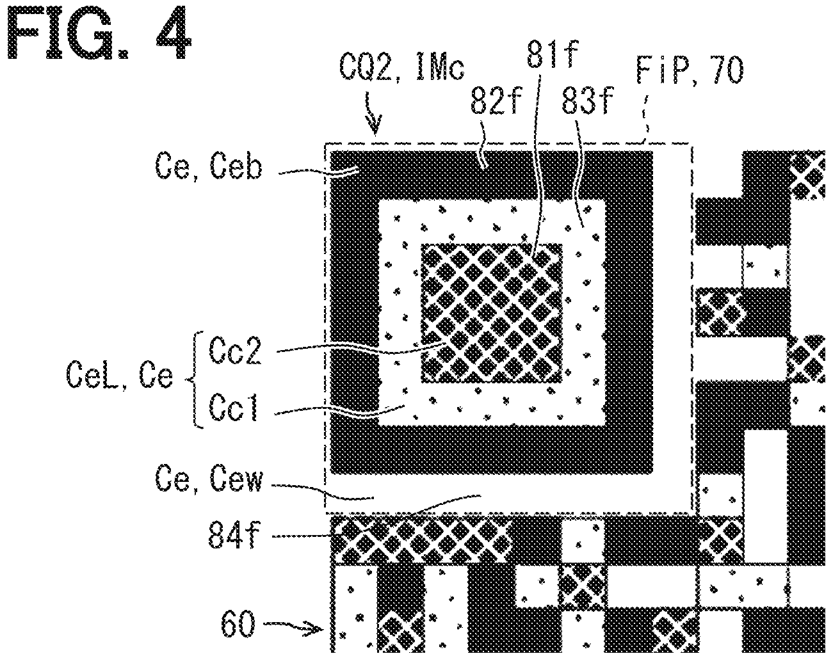
FIG. 4 is an enlarged view of a region IV of the information code shown in FIG. 1.
Figure 5:
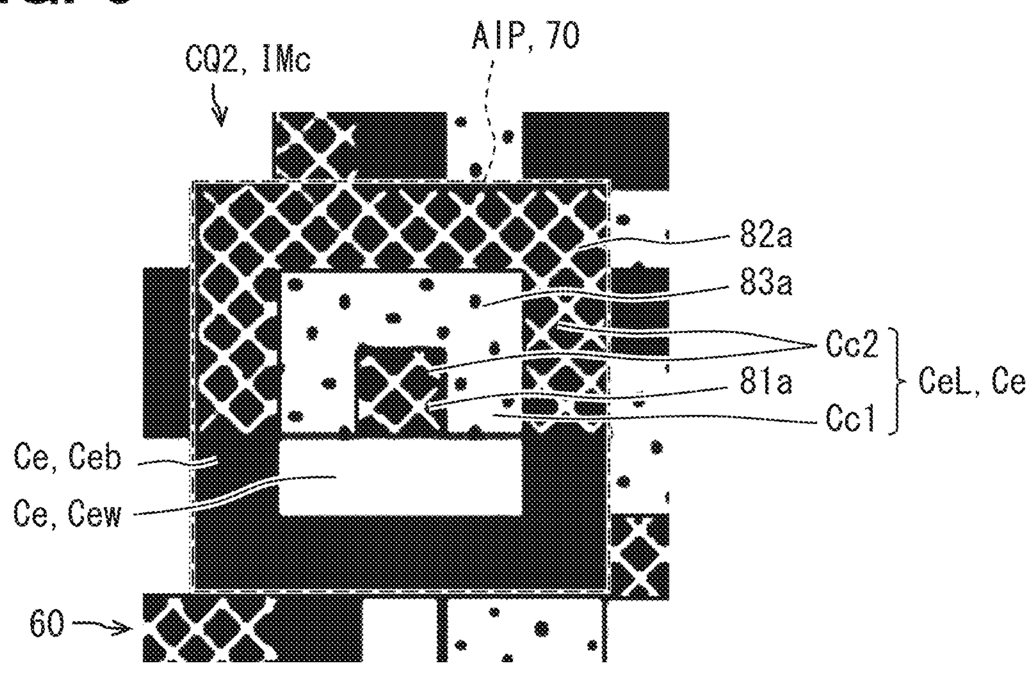
FIG. 5 is an enlarged view of a region V of the information code shown in FIG. 1.

The color of each cell Ce in the code image IMc actually captured by the image sensor may differ from a pre-defined reference color depending on the condition of the paper and ink on which the information code CQ2*x* is printed, a lighting condition when the image is captured, or a performance of the image sensor (see FIG. 3). Such a difference between the reference color and the actually captured color may lead to an erroneous determination of the color of the cell Ce (composite cell CeL), and may result in a decrease in reading accuracy. As shown in FIG. 3, in the information code CQ2*x* shown as a comparative example, setting of the color reference area 70, which is set in the information code CQ2 (see FIG. 1) of the present disclosure, is omitted. The color reference area 70 will be described with reference to FIG. 4 and FIG. 5.

In the information code CQ2 of the present disclosure, the color reference area 70 is provided. The color reference area 70 shows the colors of the light color cell Cc1 and the dark color cell Cc2 as respective states of the multiple types of composite cells CeL used in the information recording area 60. The color reference area 70 further shows the respective states (colors) of the white cell Cew and the black cell Ceb, which are used in the information recording area 60, in addition to the respective states of the light color cell Cc1 and the dark color cell Cc2. By referring to the color reference area 70, it becomes possible to use, as a reference color, the actual color of each cell Ce in the code image IMc actually captured by the image sensor.

The color reference area 70 is provided at a predetermined position in the information code CQ2. In the information code CQ2, the color reference area 70 includes the above-described finder pattern FiP and the alignment pattern AlP. As described above, the shapes of finder pattern FiP and alignment pattern AlP are defined in advance and used to read the information recording area 60. The multiple (three) finder patterns FiP and all of the alignment patterns AlP positioned in the information recording area 60 each individually configure the color reference area 70. As described above, the color reference area 70 is positioned adjacent to or in contact with the information recording area 60 and also inside the information recording area 60.

In a conventional finder pattern FiP (see FIG. 3), the central portion 81*f* and the frame portion 82*f* are provided by the black cells Ceb, and the blank portions 83*f*, 84*f* are provided by the white cells Cew. In the finder pattern FiP (see FIG. 4) provided as the color reference area 70, the central portion 81*f* is provided by the dark color cells Cc2, and the frame portion 82*f* is provided by the black cells Ceb. In the finder pattern FiP (see FIG. 4) provided as the color reference area 70, the inner blank portion 83*f* is provided by the light color cells Cc1, and the outer blank portion 84*f* is provided by the white cells Cew. As a result, the central portion 81*f*, the frame portion 82*f*, and the blank portions 83*f* and 84*f* serve as color sample regions showing the respective states of the dark color cell Cc2, the light color cell Cc1, the black cell Ceb, and the white cell Cew, respectively.

In a conventional alignment pattern AlP (see FIG. 3), the central portion 81*a* and the frame portion 82*a* are provided by the black cells Ceb, and the blank portion 83*a* is provided by the white cells Cew. In the alignment pattern AlP (see FIG. 5) provided as the color reference area 70, the central portion 81*a* is provided by the dark color cells Cc2, and the frame portion 82*a* is provided by both the black cells Ceb and the dark color cells Cc2. The number of dark color cells Cc2 in the frame portion 82*a* is greater than the number of black cells Ceb. Therefore, the area of the dark color cells Cc2 is larger than the area of the black cells Ceb in the frame portion 82*a*. The central portion 81*a* and a part of the frame portion 82*a* serve as a color sample region showing the states of dark color cells Cc2, and the remaining portion of frame portion 82*a* serves as a color sample region showing the states of black cells Ceb.

In the alignment pattern AlP (see FIG. 5) provided as the color reference area 70, the blank portion 83*a* is provided by the light color cells Cc1 and the white cells Cew. The number of light color cells Cc1 in the blank portion 83*a* is greater than the number of white cells Cew. Therefore, the area of the light color cells Cc1 is larger than the area of the white cells Cew in the blank portion 83*a*. The blank portion 83*a* serves as a color sample region showing the states of the light color cell Cc1 and the white cell Cew.

Figure 6:
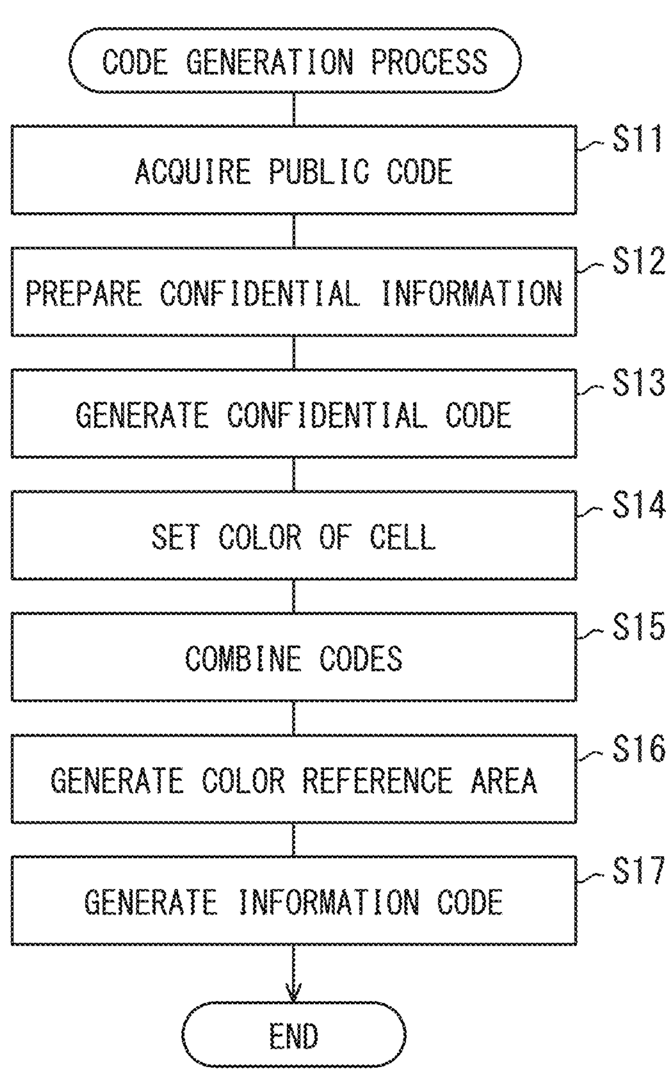
FIG. 6 is a flowchart showing a code generation process executed by a history management server.

The following will describe a code generation process (code generation method) for generating the above-described information code CQ2 with reference to FIG. 6, by further referring to FIG. 1 to FIG. 5.

In the code generation process, first, the public code Cd1 and the confidential code Cd2 are prepared. In S11, the history management server 20 acquires the public code Cd1, which is output from the code output device 22. In S12, the history management server 20 acquires the hash value reflecting the item information and the transaction record, and prepares the confidential information mainly including the hash value. In S13, the history management server 20 generates the confidential code Cd2 in which the confidential information is recorded.

In S14, the history management server 20 sets the state of cell Ce in the information recording area 60, which is used for recording the information. Specifically, in S14, the colors to be used in the light color cell Cc1 and the dark color cell Cc2 are set. In S15, the history management server 20 combines the public code Cd1 and the confidential code Cd2, which are prepared in S11 to S13, by superimposing one code on another code according to the above-described predetermined rule. In S15, the information recording area 60 for recording both the public and confidential information is generated by the arrangement of the white cells Cew, the black cells Ceb, the light color cells Cc1, and the dark color cells Cc2.

In S16, the history management server 20 generates, at a predefined position, the color reference area 70 indicating respective states of the white cell Cew, the black cell Ceb, the light color cell Cc1, and the dark color cell Cc2. Herein, the states of cells refer to the colors of the white cell Cew, the black cell Ceb, the light color cell Cc1, and the dark color cell Cc2, which are set in S14. In S16, the finder pattern FiP and the alignment pattern AlP of the two-dimensional code combined in S15 are set in the color reference area 70. As a result, the patterns FiP, AlP (see FIG. 3) including only the white cells Cew and the black cells Ceb are replaced with a finder pattern FiP (see FIG. 5) and an alignment pattern AlP (see FIG. 6), each of which also includes the light color cells Cc1 and the dark color cells Cc2. The information code CQ2 generated in this manner is transmitted to the transaction party TR in S17.

Figure 7:
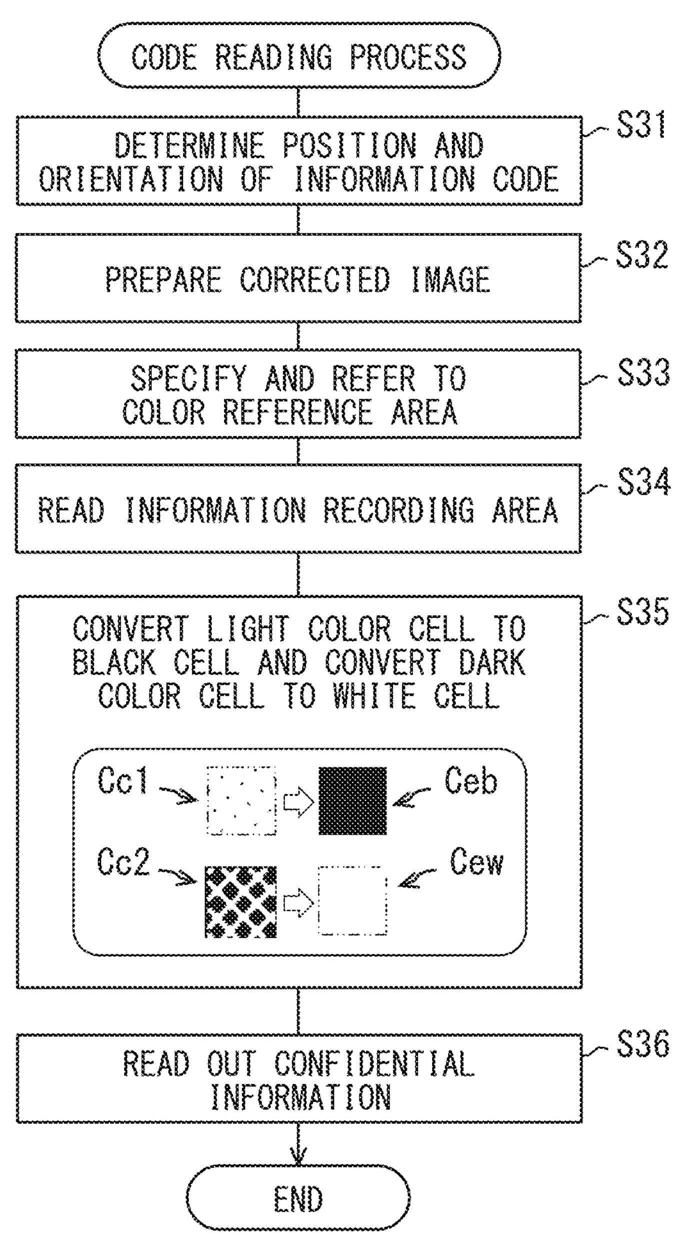
FIG. 7 is a flowchart showing a code reading process executed by a code scanner.
Figure 8:
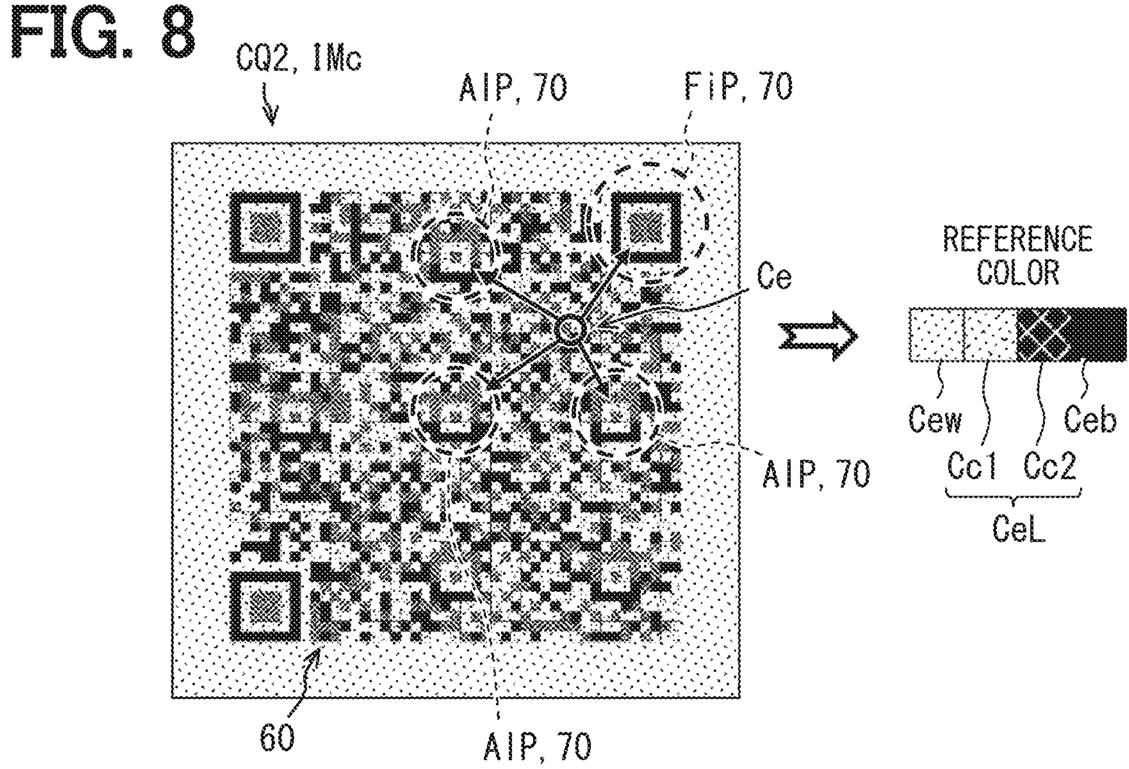
FIG. 8 is a diagram showing details of weighting of reference color information performed in the code reading process.

The following will describe a code reading process (code reading method) for reading the confidential code Cd2 from the information code CQ2 with reference to FIG. 7, by further referring to FIG. 1, FIG. 2, and FIG. 8.

In the code reading process, the signal processing unit 41 determines, in S31, a position and an orientation of the information code CQ2 included in the code captured image based on detection of the finder pattern. Based on the position and orientation information of the information code CQ2, the signal processing unit 41 applies, in S32, a pre-processing, such as keystone correction and color correction to the area including the information code CQ2, and prepares a processed corrected image suitable for code reading. In the corrected image, the information code CQ2 is corrected to have a shape when the information code CQ2 is captured from a front direction of the code.

In S33, the signal processing unit 41 identifies the information recording area 60 located at a predefined position of the information code CQ2 included in the corrected image. The position of information recording area 60 may be set in the application in advance, or may be automatically extracted from the information code CQ2. The signal processing unit 41 sets all of the finder patterns FiP and the alignment patterns AlP included in the information code CQ2 as the color reference area 70.

By referring to the finder pattern FiP and the alignment pattern AlP, the signal processing unit 41 grasps the state of each of the white cell Cew, the black cell Ceb, the light color cell Cc1, and the dark color cell Cc2, specifically, the actual colors of the cells as the cells appear in the corrected image. The signal processing unit 41 acquires the state of each cell Ce individually for all of the color reference area 70, and uses the acquired state information (color information) as reference color information to be used when reading the information code. The signal processing unit 41 holds information on the reference color acquired from each color reference area 70 in association with the position information of each color reference area 70.

In S34 to S36, the signal processing unit 41 reads out the confidential information of the confidential code Cd2, which corresponds to a reading target, based on the reference color information of each cell Ce, which is acquired by referring to the color reference area 70 in S33. In S34, the signal processing unit 41 reads the information recording area 60. In S34, the types of the white cell Cew, the black cell Ceb, the light color cell Cc1, and the dark color cell Cc2 are determined using information on multiple reference colors acquired from the finder pattern FiP and the alignment pattern AlP. In S34, the reference color information acquired from the patterns FiP, AlP closer to the target cell Ce, whose type is to be determined, is assigned with a higher weight in the process of determining the type of target cell Ce.

As an example, when four color reference areas 70 are positioned around the target cell Ce to be determined (see FIG. 8), the signal processing unit 41 combines the reference color information obtained from the four color reference areas 70 to set the reference color to be used in determination of the target cell Ce. At this time, the color reference area 70 (see the alignment pattern AlP in the lower right surrounded by a dashed line in FIG. 8) closest to the target cell Ce is assigned with the highest weight. As described above, the signal processing unit 41 continuously or stepwisely adjusts the setting of reference color used for determining the target cell according to the position of the target cell Ce in the information recording area 60.

In S35, the signal processing unit 41 restores the cell arrangement of confidential code Cd2, which is to be read, by performing a black-and-white conversion process on the cells Ce of the information recording area 60. In the black-and-white conversion process, the light color cell Cc1 is converted into the black cell Ceb, and the dark color cell Cc2 is converted into the white cell Cew. In S36, the signal processing unit 41 reads the confidential information from the restored confidential code Cd2, and ends the code reading process.

Instead of performing image processing that converts the colors, the signal processing unit 41 may directly read out the confidential information from the information recording area 60 by performing a signal processing to convert the reading signals of the light color cells Cc1 and the dark color cells Cc2. The code reading process may be executed by the history management server 20. In this case, the captured code image IMc or the corrected image is transmitted from the code scanner 23 to the history management server 20. The history management server 20 executes the code reading process on the confidential code Cd2, which is acquired from the received code captured image or the received corrected image Pc0.

In the present embodiment described so far, when reading the information code, the state of composite cell CeL can be determined by referring to the color reference area 70 provided at the predefined position. Therefore, even when a composite cell CeL having a different state from the white cell Cew and the black cell Ceb is used in the information recording area 60, there is no need to specify the state of composite cell CeL in advance, thereby ensuring the use convenience of the information code CQ2.

The color information actually extracted from the color reference area 70 is affected by the paper, ink, light, camera performance, at a same level as the cells Ce arranged in the information recording area 60. Therefore, the color information extracted from the color reference area 70 becomes more suitable reference color information for identifying the cells Ce in the information recording area 60, compared with the preset color information. Therefore, the reading accuracy of information code CQ2 can be further improved.

In the present embodiment, the color reference area 70 is provided in at least one of an adjacent area, which is adjacent to or in contact with the information recording area 60, or an inside area, which is inside the information recording area 60. With this configuration, since the color reference area 70 is positioned not far from the information recording area 60, the color reference area 70 is less likely to be cut off when the information code CQ2 is photographed. Therefore, the deterioration in the usability of the information code CQ2 due to the provision of the color reference area 70 can be avoided.

In the present embodiment, the color reference area 70 is provided both in an area adjacent to or in contact with the information recording area 60 and an area within the information recording area 60. Therefore, even when the color of each cell Ce differs at each location of the information recording area 60 captured in the code image IMc due to the influence of light condition, by referring to the color reference area 70 close to the target cell Ce, a decrease in reading accuracy caused by differences in captured color can be avoided.

In the present embodiment, the finder pattern FiP and the alignment pattern AlP, whose shapes are defined in advance and which are used to read the information recording area 60, configure the color reference area 70. That is, in the code generation process, the patterns FiP and AlP are set in the information recording area 60 such that the patterns FiP and AlP include the composite cells CeL. Then, in the code reading process, each of the patterns FiP, AlP is used as the color reference area 70, and state information indicating the state of composite cell CeL is referred from the patterns. According to this configuration, it becomes possible to set the reference color of each cell Ce in accordance with the recognition of the finder pattern FiP and the alignment pattern AlP, which is performed before reading of the information recording area 60. As a result, when a process that refers to the color reference area 70 is performed, a decrease in reading speed can be avoided.

In the present embodiment, the finder patterns FiP and the alignment patterns AlP individually configure the color reference areas 70. In the code generation process, multiple patterns FiP, AlP are set in respective color reference areas 70 such that the multiple patterns FiP, AlP include the composite cells CeL. In the code reading process, the state information is obtained individually from each of the multiple patterns FiP, AlP that are set as the color reference areas 70.

As described above, by referring to multiple patterns FiP, AlP, rather than referring to only one pattern FiP, AlP, it is possible to appropriately set the reference color. Therefore, even when the color of each cell Ce differs at each location of the information recording area 60 captured in the code image IMc due to the influence of light condition, by referring to the color reference area 70 close to the target cell Ce, a decrease in reading accuracy caused by differences in captured color can be avoided.

In the present embodiment, the state information acquired from the patterns FiP, AlP closer to the target composite cell CeL, whose type is to be determined, is assigned with a higher weight in the process of determining the type of target composite cell CeL. According to this configuration, decrease in reading accuracy caused by differences in color due to the influence of light condition can be more reliably suppressed.

In the present embodiment, in the patterns FiP, AlP that serve as the color reference area 70, multiple consecutive cells Ce configure a region that indicates the state (color) of one type of composite cell CeL. In this way, a large area showing the state of composite cell CeL is ensured, so that the color standard for distinguishing the different types of composite cells CeL can be set with a higher accuracy.

In the present embodiment, the information recording area 60 includes, as the composite cells CeL, the light color cell Cc1 which is closer to the white cell Cew compared to the black cell Ceb, and the dark color cell Cc2 which is closer to the black cell Ceb compared to the white cell Cew. The information recording area 60 records the public information and the confidential information by the arrangement of white cells Cew, black cells Ceb, light color cells Cc1, and dark color cells Cc2. The color reference area 70 shows the states of light color cells Cc1 and dark color cells Cc2.

In the code reading process, the information recording area 60 for recording the public information and the confidential information is read by the arrangement of the white cells Cew, the black cells Ceb, the light color cells Cc1, and the dark color cells Cc2. Then, the light color cells Cc1 are converted into the black cells Ceb and the dark color cells Cc2 are converted into the white cells Cew, thereby restoring the cell arrangement of confidential code Cd2, which is to be read.

According to the above configuration, the light color cell Cc1 is determined as the white cell Cew in the reading of the public code Cd1, and the light color cell Cc1 is determined as the black cell Ceb in the reading of the confidential code Cd2. The dark color cell Cc2 is determined as the black cell Ceb in the reading of the public code Cd1, and the dark color cell Cc2 is determined as the white cell Cew in the reading of the confidential code Cd2. Thus, the information code CQ2 to which the confidential information is added can be read by using the existing code reader 13. As described above, by improvement in compatibility of the traceability system 120 with the old system, it is possible to lower a barrier to introduce the traceability system 120 into the old system.

In the present embodiment, the color reference area 70 shows the states of white cells Cew and black cells Ceb, in addition to all types of composite cells CeL. That is, in the code generation process, in addition to all types of composite cells CeL, the white cells Cew and the black cells Ceb used in the information recording area 60 are also arranged in the color reference area 70. As described above, even when the white cells Cew and the black cells Ceb are different from normal reference colors of white and black due to the influence of the paper and ink on which the information code CQ2 is printed, deterioration in reading accuracy of the information code can be avoided by the configuration of the present disclosure.

In the color reference area 70 of the present embodiment, the area showing the state of the composite cell CeL is secured to be larger than the area showing the state of the white cell Cew or the black cell Ceb. According to this configuration, the state of the composite cell CeL, which is difficult to be read, can be determined with a higher accuracy. As a result, reading accuracy can be further improved.

In the present embodiment, the signal processing unit 41 corresponds to a processing unit that performs the code reading method, and the public code Cd1 and the confidential code Cd2 each corresponds to a pre-combination code. The white cell Cew corresponds to a light cell, the black cell Ceb corresponds to a dark cell, the light color cell Cc1 corresponds to a semi-light cell, and the dark color cell Cc2 corresponds to a semi-dark cell. The color reference area 70 corresponds to a state reference area, and the finder pattern FiP and the alignment pattern AlP each corresponds to a defined pattern.

OTHER EMBODIMENTS

Although one embodiment according to the present disclosure has been described above, the present disclosure is not construed as being limited to the embodiment and can be applied to various embodiments and combinations within a scope not departing from the spirit of the present disclosure.

In the above embodiment, both the finder pattern FiP and the alignment pattern AlP are used as the color reference area 70. In the first and second modifications of the above embodiment, the color reference area 70 may be provided only in the adjacent area adjacent to or in contact with the information recording area 60, or the color reference area 70 may be provided only in the inside area of the information recording area 60.

In the first modification of the above embodiment, partial or all of the finder patterns FiP may be used as the color reference area 70, while the alignment patterns AlP are not used as color reference area 70. As described above, when the information code CQ2 is recognized, it is already known that the finder patterns FiP are included in the captured code image IMc. The finder patterns FiP each is a defined pattern that occupies a large area of the information code CQ2. Therefore, by using the finder pattern FiP as the color reference area 70, it becomes possible to smoothly obtain the state information (color information) of the composite cell CeL. In the case of a small-sized two-dimensional code in which no alignment pattern AlP exists, the color reference area 70 may be provided by the finder pattern FiP.

In the second modification of the above embodiment, partial or all of the alignment patterns AlP may be used as the color reference area 70, while the finder patterns FiP are not used as the color reference area 70. Such alignment patterns AlP are arranged in a well-balanced manner within the inner range of the information recording area 60. Therefore, when the alignment pattern AlP is used as the color reference area 70, it becomes possible to reduce the influence of light condition.

In the third modification of the above embodiment, partial or all of the timing patterns may be used as the color reference area 70 instead of the finder pattern FiP and the alignment pattern AlP, or together with the finder pattern FiP and the alignment pattern AlP. In the timing pattern of the third modification, the light color cells Cc1 and the dark color cells Cc2 are arranged alternately. In another example of the timing pattern, the white cell Cew, the black cell Ceb, the light color cell Cc1, and the dark color cell Cc2 may be arranged in the described order. The timing pattern has a shape that extends vertically and horizontally within the information recording area 60. Therefore, correction of color by row and column becomes easy by using the timing pattern as the color reference area 70.

In the fourth modification of the above embodiment, a cell Ce at a specific position within the information recording area 60 is used as the color reference area 70, instead of the defined pattern, such as the finder pattern FiP. The data lost due to the formation of the color reference area 70 is compensated for by an error correction function that is already provided in the information code CQ2. As described above, when the deterioration of the recognition rate is tolerable, as in the fourth modification example, a part of the information recording area 60 may be used as the color reference area 70.

In the fifth and sixth modification examples of the above embodiment, the color reference area 70 is provided at a specific position around the information recording area 60. Specifically, in the fifth modification, a bar-shaped color reference area 70 is arranged in the quiet zone QZ (see FIG. 1). The bar-shaped color reference area 70 may be an area showing state of each composite cell CeL, or may be an area showing all of the states of the composite cells CeL, the white cells Cew, and the black cells Ceb. In the sixth modification, a bar-shaped color reference area 70 is arranged outside the quiet zone QZ. The color reference area 70 may be separated from the information recording area 60 as long as it is possible to read the color reference area 70 together with the information recording area 60. By arranging the color reference area 70 outside the information recording area 60 as in the fifth and sixth modification examples, color correction near the outer edge of the information code CQ2 can be performed with higher accuracy.

In the seventh modification of the above embodiment, in the frame QR, the image inserted into the information recording area 60 is used as the color reference area 70. For example, the bar-shaped color reference area 70 may be provided together with an inserted logo so that the logo indicates all colors of the composite cells CeL. Alternatively, a logo of the same color as the colors of the composite cells CeL may be inserted so that the logo indicates all colors of the composite cells CeL.

In the sixth modification of the above embodiment, the public code CdP and the confidential code CdS are different versions from one another. Even when pre-combination codes with different numbers of cells are combined as in the eighth modification, the configuration in which the color reference area 70 indicates the state of composite cell CeL is effective in improving use convenience of information code CQ2.

In the ninth modification of the above embodiment, the white cells Cew and the black cells Ceb are not used in the information recording area 60. In the information recording area 60, four types of chromatic color cells are used as composite cells CeL, and the four types of composite cells CeL are arranged in a two-dimensional array for recording information of the two pre-combination codes. In the ninth modification example, when use of the information code in the existing distribution management system 110 (code reader 13) is not anticipated, all of the cells Ce arranged in the information recording area 60 may be configured as composite cells CeL.

In the tenth modification of the above embodiment, a light gray cell and a dark gray cell may be used instead of the light color cell Cc1 and the dark color cell Cc2, respectively. For example, when the label printer 12 is not capable of outputting color print, but is capable of outputting grayscale print, it is beneficial to adopt light and dark gray cells.

The light gray cell Ce has an achromatic color that is closer to the color of white cell Cew than to the color of black cell Ceb, and has an intermediate color with a higher brightness than that of the dark gray cell. For example, light gray having brightness of about 75% of that of the white cell Cew is adopted as the color of the light gray cell. The dark gray cell Ce has an achromatic color that is closer to the color of black cell Ceb than to the color of white cell Cew, and has an intermediate color with a lower brightness than that of the light gray cell. For example, dark gray having brightness of about 25% of that of the white cell Cew is adopted as the color of the dark gray cell.

In the eleventh modification of the above embodiment, a light pattern cell and a dark pattern cell are used instead of the light color cell Cc1 and the dark color cell Cc2. For example, when the label printer 12 is not capable of outputting grayscale print, but is only capable of outputting black or white print, it is beneficial to adopt the light and dark pattern cells.

In the light pattern cells and the dark pattern cells, for example, hatching and dots may be provided as the patterns. In the light pattern cell, an area of the black portion is smaller than an area of the white portion. In the dark pattern cell, an area of the black portion is larger than an area of the white portion.

In the above embodiment, the color settings of all the finder patterns FiP provided as the color reference areas 70 are the same with one another. In the twelfth modification of the above embodiment, the color setting of the color reference area 70 differs for each finder pattern FiP. In one finder pattern FiP, an area of the white cells Cew and the black cells Ceb may be set larger than an area of the chromatic composite cells CeL. Such a color setting makes it possible to reduce the printing cost of the information code CQ2. The areas showing the respective states of the white cells Cew and the black cells Ceb may be omitted in the color reference area 70. That is, the color reference area 70 may include only areas showing the various states of the composite cells CeL.

In the above embodiment, a light color forming the white cell Cew may not be a strict white color. For example, a color of a base material such as a label where the information code CQ2 is printed (for example, fairly light gray or ivory) may correspond to the light color. Similarly, a dark color forming the black cell Ceb may not be a strict black. For example, a color of ink used in the label printer 12 (for example, dark blue or dark green) may correspond to the dark color.

The pre-combination code is not limited to a QR code. A two-dimensional code different from the QR code may be used as a pre-combination code, and then combined into the information code.

The information code CQ2 according to the present disclosure may be used by in a system, other than the distribution management system 110 and the traceability system 120 described above. The information recorded in the pre-combination code is not limited to the above-described public information and confidential information, and may be changed as appropriate depending on the application of the information code. For example, instead of the above-described hash value, a unique identification (UID) that identifies the item shipped from the trader TR may be recorded as the confidential information.

In the above embodiment, in addition to the information code CQ2 used in the supply chain SC, the trace code QRt is generated and attached to the final product FP. The information code CQ2 may be used as the trace code QRt. In this case, the traceability check application executes the code reading process and provides the user terminal 50 with a function for reading the confidential code Cd2. The final product FP supplied by the supply chain SC may be appropriately changed. For example, the traceability system 120 may manage various items such as an automobile, a battery, a semiconductor, fresh food, an aquatic product, food, flowers, a pharmaceutical, or a chemical product.

The hash function used in the history management server 20 is a cryptographic hash function and has a characteristic that the same hash value is not output from different inputs and it is substantially impossible to estimate an input from the output hash value. For example, instead of SHA-256, an encryption algorithm such as SHA-1, SHA-2, or SHA-3 may be appropriately used according to an output length (the number of bits) recordable in the confidential code Cd2 as the confidential information. The code generation process executed by the history management server 20 may be executed by the code output device 22 or another device on edge side. In this case, the code output device 22 corresponds to a code generation apparatus.

In the above embodiment, functions provided by the history management server, the code scanner, and the like may be provided in software manner, or by hardware circuits for executing the software, only in software manner, only by hardware circuits, or a combined manner of software and hardware. When such functions are provided by an electronic circuit as the hardware circuits, each function may be provided by a digital circuit including a large number of logic circuits or by analog circuits.

The processing unit (signal processing unit) in the above embodiment may include at least one computing core, such as a central processing unit (CPU) and a graphics processing unit (GPU). The processing unit may further include a field-programmable gate array (FPGA), a neural network processing unit (NPU), and an IP core having another dedicated function.

A non-transitory tangible storage medium that is adopted as each storage medium in the above embodiment stores one or more programs related to code generation or code reading as described above, and may be appropriately changed. For example, the storage medium is not limited to a configuration provided on a circuit board, and may be provided by a memory card inserted into a slot portion to electrically connect to a bus of a computer. The storage medium may be an optical disc, a hard disk drive, or the like used as a source of copying or distributing a program to a computer.

The processing unit and the method thereof described in the present disclosure may be implemented by a special purpose computer, which includes a processor programmed to execute one or more functions performed by computer programs. Alternatively, the processing unit and the method thereof according to the present disclosure may be implemented by a dedicated hardware logic circuit. Alternatively, the processing unit and the method thereof according to the present disclosure may be implemented by one or more dedicated computers implemented by a combination of a processor that executes a computer program and one or more hardware logic circuits. The computer program may be stored in a computer-readable non-transitory tangible storage medium as instructions to be executed by a computer.

What is claimed is:

1. An information code comprising:

an information recording area including multiple types of composite cells, the information code being generated by combining two pre-combination codes each of which records information by an array of light cells and dark cells, the composite cells in the information recording area having different states from the light cells and the dark cells, information of each of the two pre-combination codes being recorded in the information recording area by the multiple types of the composite cells; and a state reference area arranged in at least one defined pattern, which has a shape defined in advance and is used for reading the information recording area, and indicating respective states of the composite cells, wherein, in the at least one defined pattern, cells indicating the states of the multiple types of the composite cells included in the information recording area are arranged in a consecutive manner.

2. The information code according to claim 1, wherein a plurality of state reference areas include a plurality of the at least one defined pattern, respectively.

3. The information code according to claim 1, wherein the information recording area includes the composite cells, the composite cells include semi-light cells each of which has a color closer to colors of the light cells than colors of the dark cells, and semi-dark cells each of which has a color closer to the colors of the dark cells than the colors of the light cells, the light cells, the dark cells, the semi-light cells, and the semi-dark cells are arranged in an array to record the information of each of the two pre-combination codes, and the state reference area indicates respective states of the semi-light cells and the semi-dark cells.

4. The information code according to claim 1, wherein the state reference area indicates respective states of the light cells and the dark cells, which are used in the information recording area, in addition to the respective states of all types of the composite cells.

5. A code generation method executed by at least one processor, the code generation method comprising:

preparing two pre-combination codes each of which recording information using an array of light cells and dark cells;

generating an information recording area that records the information of each of the two pre-combination codes using multiple types of composite cells, the composite cells having different states from the light cells and the dark cells; and generating a state reference area indicating respective states of the composite cells in at least one defined pattern, which has a shape defined in advance and is used for reading the information recording area, wherein the state reference area is generated such that cells indicating the states of the multiple types of the composite cells included in the information recording area are arranged in a consecutive manner.

6. The code generation method according to claim 5, wherein the generating of state reference area includes generating a plurality of the defined patterns, respectively, in a plurality of state reference areas, and each of the plurality of the defined patterns includes the composite cells.

7. The code generation method according to claim 5, wherein the generating of state reference area includes arranging, in the state reference area, the light cells and the dark cells used in the information recording area, in addition to all types of the composite cells.

* * * * *